(12) United States Patent
Carlsson et al.

(10) Patent No.: US 9,167,255 B2
(45) Date of Patent: Oct. 20, 2015

(54) REGION-OF-INTEREST AWARE VIDEO CODING

(71) Applicant: Microsoft Corporation, Redmond, WA (US)

(72) Inventors: Pontus Carlsson, Bromma (SE); Magnus Hemmendorff, Stockholm (SE); Konrad Hofbauer, Stockholm (SE); Sergei Nikiforov, Stockholm (SE); David Zhao, Solna (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 97 days.

(21) Appl. No.: 14/038,580

(22) Filed: Sep. 26, 2013

(65) Prior Publication Data

US 2015/0016510 A1    Jan. 15, 2015

(51) Int. Cl.
| | |
|---|---|
| G06K 9/36 | (2006.01) |
| G06K 9/46 | (2006.01) |
| H04N 19/146 | (2014.01) |
| H04N 19/15 | (2014.01) |
| H04N 19/126 | (2014.01) |
| H04N 19/17 | (2014.01) |
| H04N 19/192 | (2014.01) |
| H04N 19/196 | (2014.01) |
| H04N 19/167 | (2014.01) |

(52) U.S. Cl.
CPC ........... *H04N 19/146* (2014.11); *H04N 19/126* (2014.11); *H04N 19/15* (2014.11); *H04N 19/167* (2014.11); *H04N 19/17* (2014.11); *H04N 19/192* (2014.11); *H04N 19/198* (2014.11)

(58) Field of Classification Search
None
See application file for complete search history.

(56) References Cited

U.S. PATENT DOCUMENTS

| | | | |
|---|---|---|---|
| 8,019,175 B2 | 9/2011 | Lee et al. | |
| 8,345,749 B2 | 1/2013 | Quast et al. | |
| 8,351,513 B2 | 1/2013 | Wen et al. | |
| 8,406,297 B2 | 3/2013 | Lu et al. | |
| 2002/0122489 A1 | 9/2002 | Kuniba | |
| 2003/0147462 A1 | 8/2003 | Maeda | |
| 2005/0024487 A1 | 2/2005 | Chen | |
| 2006/0238444 A1* | 10/2006 | Wang et al. | 345/55 |

(Continued)

FOREIGN PATENT DOCUMENTS

| | | |
|---|---|---|
| EP | 1248470 | 3/2000 |
| EP | 1453321 | 9/2004 |
| WO | WO-0018131 | 3/2000 |

OTHER PUBLICATIONS

"International Search Report and Written Opinion", Application No. PCT/US2014/045510, Sep. 24, 2014, 10 pages.
Ciubotaru, et al., "Objective Assessment of Region of Interest-Aware Adaptive Multimedia Streaming Quality", In IEEE Transactions on Broadcasting, vol. 55, Issue 2, Jun. 2009, 11 pages.

(Continued)

*Primary Examiner* — Phuoc Tran
(74) *Attorney, Agent, or Firm* — Danielle Johnston-Holmes; Micky Minhas

(57) ABSTRACT

An encoder comprising an encoding module and an adaptation module. The encoding module is configured to encode video in at least one region-of-interest and outside the region-of-interest. The encoding comprises quantization, and the encoding module is operable to apply a difference in quantization granularity between the encoding inside and outside the region-of-interest. The adaptation module is configured to determine at least one metric representative of a difference in benefit of the quantization inside and outside the region-of-interest, and to adapt the difference in quantization granularity in dependence on this metric.

20 Claims, 3 Drawing Sheets

(56) References Cited

U.S. PATENT DOCUMENTS

2008/0225945 A1* 9/2008 Wu et al. .................. 375/240.03
2012/0224629 A1 9/2012 Bhagavathy et al.
2012/0275511 A1 11/2012 Shemer et al.

OTHER PUBLICATIONS

"Second Written Opinion", Application No. PCT/US2014/045510, Jul. 3, 2015, 7 pages.

* cited by examiner

REGION-OF-INTEREST AWARE VIDEO CODING

RELATED APPLICATION

This application claims priority under 35 USC 119 or 365 to Great Britain Application No. 1312382.3 filed Jul. 10, 2013, the disclosure of which is incorporate in its entirety.

BACKGROUND

In modern communications systems a video signal may be sent from one terminal to another over a medium such as a wired and/or wireless network, often a packet-based network such as the Internet. Typically the frames of the video are encoded by an encoder at the transmitting terminal in order to compress them for transmission over the network. The encoding for a given frame may comprise intra frame encoding whereby blocks are encoded relative to other blocks in the same frame. In this case a target block is encoded in terms of a difference (the residual) between that block and a neighbouring block. Alternatively the encoding for some frames may comprise inter frame encoding whereby blocks in the target frame are encoded relative to corresponding portions in a preceding frame, typically based on motion prediction. In this case a target block is encoded in terms of a motion vector identifying an offset between the block and the corresponding portion from which it is to be predicted, and a difference (the residual) between the block and the corresponding portion from which it is predicted. A corresponding decoder at the receiver decodes the frames of the received video signal based on the appropriate type of prediction, in order to decompress them for output to a screen. A generic term that may be used to refer to an encoder and/or decoder is a codec.

Prior to prediction coding the samples of each bock are typically quantized in order to reduce the bitrate incurred in encoding the block. Quantization refers to the process of taking samples represented on a relatively large scale or from amongst values of a relatively large set, and converting them to samples represented on a relatively small scale or from amongst a relatively small set (which may be referred to as the quantization levels). For instance quantization may refer to the process of converting an effectively continuous variable (e.g. a digital approximation of a continuous variable) into variable constrained to a set of substantially discrete levels. The granularity of the quantization refers to the size of the spacing between the possible quantized values of the scale or set from which samples to be represented are constrained to being selected, i.e. the size of the steps between quantization levels. This may also be described as the coarseness or fineness of the quantization. Depending on the granularity, the quantization introduces some distortion into the representation of a video image but also reduces the number of bits required to represent the image.

Some video codecs such as those designed according to the H.264 standard allow quantization granularity to be set as a parameter of the encoding (and signalled to the decoder in the form of side information transmitted along with the encoded bitstream). It is also possible to define a region-of-interest (ROI) within the area of the video frames, and to set a difference in quantization parameter inside and outside the ROI defined by a fixed quantization parameter offset. A codec designer can potentially use the ROI to cover any region of the video where it is desired to spend more bits on better quality. One possible use is to cover the face or facial features. For example this way more of the potentially limited bandwidth available for transmitting the video over a network can be spent on providing quality in the ROI while relatively few bits need be spent encoding the background and/or regions of lesser significance.

SUMMARY

The inventors have appreciated that the existing approach does not always produce the most desirable results. For instance, in a video call the video image is typically made up of a talking head against a largely static background, so the ROI may be set in a region of the image around the head, face or certain moving features such as the mouth, eyebrows and eyes. In the case of a talking head with constant background, the encoding of the background by inter-frame coding will actually incur few or no bits regardless of any difference in the quantization parameter inside and outside a region-of-interest, because the residual between frames is zero regardless of the quantization step size. However, if the quantization is too coarse outside the ROI then the occasional intra coding of the background will be poor quality and also small changes in the background will introduce increasing degradation over time. Therefore in fact, in some circumstances applying a certain quantization offset between the ROI and outside the ROI may degrade the quality outside the ROI without a corresponding improvement in the ROI. A similar issue may occur in situations other than video calls or talking heads. It would be desirable to provide a more balanced trade-off between quality improvement in the ROI and quality degradation outside the ROI.

According to one aspect of the present disclosure, there is provided an encoder comprising an encoding module and an adaptation module. The encoding module encodes video in at least one region-of-interest and outside the region-of-interest. The encoding comprises a quantization process, and the encoding module is able to apply a difference in quantization granularity between the encoding inside and outside the region-of-interest. The adaptation module determines at least one metric representative of a difference in benefit of the quantization inside and outside the region-of-interest, and based on this it dynamically adapts the difference in quantization granularity. For instance the metric may comprise an indication of bitrate incurred by encoding inside the region-of-interest relative to bitrate incurred by encoding outside. By moderating the difference in coarseness of the quantization in dependence on the data being encoded, some degree of higher quality may still be allowed in regions of interest such as the face, but not always to the same extreme as in prior techniques. The encoder is thereby able to provide greater opportunity for improving the overall subjective quality of the video frame, taking into account potential effects inside and outside the ROI and not taking for granted that the ROI should be given the same preferential treatment in all circumstances.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

BRIEF DESCRIPTION OF THE DRAWINGS

For a better understanding of the described embodiments and to show how it may be put into effect, reference is made by way of example to the accompanying drawings in which.

DETAILED DESCRIPTION

Figure 1:
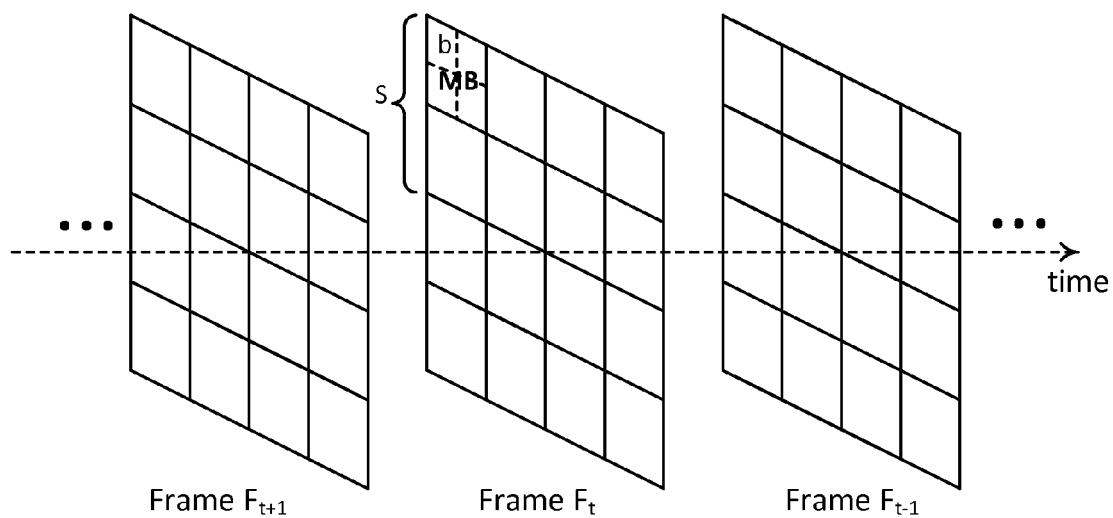
FIG. 1 is a schematic representation of a video stream.

In a basic encoder, frames are encoded without knowledge of any ROI. Distortion is considered uniformly across the frame and the objective is to minimize overall distortion in the frame. If on the other hand the encoder knows that the subjective importance of a certain region (the ROI) is high, it may spend more bits there in order to improve overall subjective quality. For instance if a scene contains a talking face and an irrelevant background, it may be beneficial to enhance the quality of the face at the expense of background quality—even though this may decrease the overall objective quality of the frame.

The present disclosure addresses the problem of how to distribute bits between the ROI the "non-ROI" area.

An existing approach is to define a fixed quality difference between ROI and non-ROI, for instance defining that the ROI should have 2 dB higher PSNR (peak signal-to-noise ratio) than the non-ROI. In H.264 this can be achieved by using a smaller quantizer step size in the ROI than in the non-ROI (resulting in increased bitrate of the ROI). The quantization step size is set by the quantization parameter (QP): a larger QP value means a larger step size and therefore coarser granularity and lower objective quality, while a smaller QP values means a smaller step size and therefore finer granularity and higher objective quality. The difference between the ROI and non-ROI is defined by a fixed QP offset.

This approach works well for a range of videos. However, for certain videos it can degrade the quality of the non-ROI, without corresponding improvement of the ROI. Consider for instance a talking-head type of video with a static, noise-free background. A non-ROI video encoder will already spend almost all bitrate on the face, as the background can be very well predicted from preceding frames. In terms of bitrate cost, the background quality comes almost for free, because only the first, intra coded frame requires a significant amount of bits. In this case, enforcing a 2 dB difference between ROI and non-ROI will mainly degrade background quality without noticeable improvement of the face (the poor quality background from the initial intra frame will continue to linger, and small or occasional changes in the background will be reflected with poor quality). The gain in face quality when spending R bits in the face is much smaller than the gain in the background quality when spending R bits in the background. Or put another way, the rate-distortion (R-D) function of the background is significantly steeper than the R-D function of the face.

Conversely, the opposite may hold: if the background is higher entropy (i.e. has higher temporal and/or spatial complexity) than the face, the average objective quality will also benefit from assigning more bits to the face.

The following discloses an ROI-aware encoder for providing a more balanced trade-off between quality improvement in the ROI and quality degradation in outside the ROI (the "non-ROI" region).

It would be desirable to provide an encoder whose behaviour is such that it would minimize a perceptual frame distortion metric subject to a rate constraint, where the distortion metric takes into account the relative importance of the ROI and non-ROI areas. An approximation of such a distortion metric could be:

$$D_p = D_{ROI} + w \cdot D_{non-ROI}$$

where $D_{ROI}$ is the distortion in the ROI, $D_{non-ROI}$ is the distortion outside the ROI, and w is a weighting factor (w<1) such that distortion outside the ROI contributes less to the frame distortion.

However, even objective rate-distortion functions are complex to estimate—given the current encoding state, only a single point on the rate-distortion curve is known. Approximating subjective curves is even more complex.

Therefore to limit complexity and maintain robustness, the encoder disclosed in the following is based on an heuristic that approximates the ideal behaviour described above. The heuristic may be implemented as follows.

(i) Start with a quantization parameter offset (QPoffset) between the ROI and non-ROI regions set to some initial default or predetermined value, e.g. QPoffset=−12 has been found to work well for most cases (where QP is defined according to H.264);

(ii) track two moving averages of the number of bits per pixel inside and outside of the ROI respectively; and (iii) if the number of bits per pixel inside the ROI is greater than K times the number of bits per pixel outside ROI then increase QPoffset (where K>1), and if the number of bits per pixel inside the ROI is less than K times the number of bits per pixel outside then decrease QPoffset, but clip QPoffset to a certain range, e.g. [−12, 0].

In embodiments K=4 is used. Various averaging window sizes and mechanisms for QPoffset regulation may be used to obtain desired behaviour, e.g. to prevent abrupt QPoffset changes which may cause quality flickering.

The case of a static background and moving face is dealt with by point (iii): QPoffset will quickly converge to zero, thus mitigating the problem discussed above whereby a QP offset is not appropriate to all situations as it may degrade the quality of the background without providing a benefit to outweigh this in the face or other such ROI.

An example of a video coding system in which such techniques may be implemented is now described with reference FIGS. 1 to 6.

FIG. 1 gives a schematic illustration of an input video signal captured from a camera, and divided into portions to be encoded by a video encoder so as to generate an encoded bitstream. The signal comprises a moving video image divided in time into a plurality of frames (F), each frame representing the image at a different respective moment in time ( . . . t−1, t, t+1 . . . ). Within each frame, the frame is divided in space into a plurality of portions each representing a plurality of pixels. The portions may for example be referred to as blocks. In certain schemes, the frame is divided and sub-divided into different levels of portion or block. For example each frame may be divided into macroblocks (MB) and each macroblock may be divided into blocks (b), e.g. each block representing a region of 8×8 pixels within a frame and each macroblock representing a region of 2×2 blocks (16×16 pixels). In certain schemes each frame can also be divided into slices (S), each comprising a plurality of macroblocks.

A block in the input signal as captured is usually represented in the spatial domain, where each colour-space channel is represented as a function of spatial position within the block. For example in YUV colour space each of the luminance (Y) and chrominance (U,V) channels may be represented as a function of Cartesian coordinates x and y, Y(x,y), U(x,y) and V(x,y); or in RGB colour space each of the red (R), green (G) and blue (B) channels may be represented as a function of Cartesian coordinates R(x,y), G(x,y), B(x,y). In this representation, each block or portion is represented by a set of pixel values at different spatial coordinates, e.g. x and y coordinates, so that each channel of the colour space is represented in terms of a respective magnitude of that channel at each of a discrete set of pixel locations.

Prior to quantization however, the block may be transformed into a transform domain representation as part of the encoding process, typically a spatial frequency domain representation (sometimes just referred to as the frequency domain). In the frequency domain each colour-space channel in the block is represented as a function of spatial frequency (dimensions of 1/length) in each of two dimensions. For example this could be denoted by wavenumbers $k_x$ and $k_y$ in the horizontal and vertical directions respectively, so that the channels may be expressed as $Y(k_x, k_g)$, $U(k_x, k_y)$ and $V(k_x, k_y)$ in YUV space; or $R(k_x, k_g)$, $G(k_x,k_y)$, $B(k_x,k_y)$ in RGB space. Thus instead of a representing a colour-space channel in terms of a magnitude at each of a discrete set of pixel positions, the transform represents each colour-space channel in terms of a coefficient associated with each of a discrete set of spatial frequency components which make up the block, i.e. an amplitude of each of a discrete set of spatial frequency terms corresponding to different frequencies of spatial variation across the block. Possibilities for such transforms include a Fourier transform, Discrete Cosine Transform (DCT), Karhunen-Loeve Transform (KLT), or others.

Figure 2:
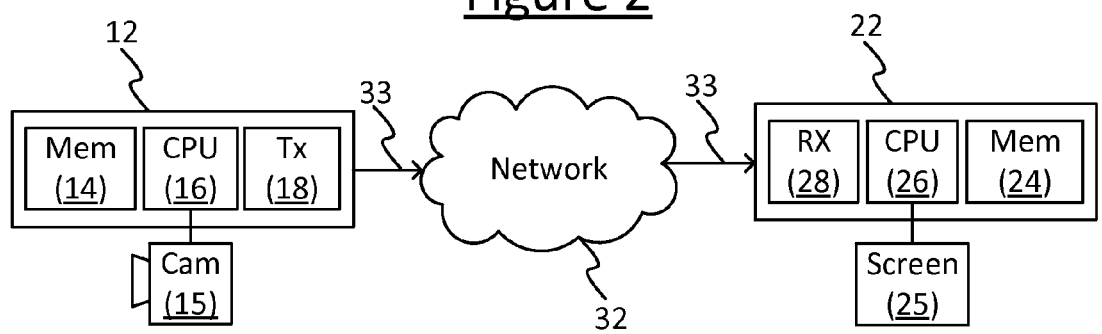
FIG. 2 is a schematic block diagram of a communication system.

The block diagram of FIG. 2 gives an example of a communication system in which the techniques of this disclosure may be employed. The communication system comprises a first, transmitting terminal 12 and a second, receiving terminal 22. For example, each terminal 12, 22 may comprise one of a mobile phone or smart phone, tablet, laptop computer, desktop computer, or other household appliance such as a television set, set-top box, stereo system, etc. The first and second terminals 12, 22 are each operatively coupled to a communication network 32 and the first, transmitting terminal 12 is thereby arranged to transmit signals which will be received by the second, receiving terminal 22. Of course the transmitting terminal 12 may also be capable of receiving signals from the receiving terminal 22 and vice versa, but for the purpose of discussion the transmission is described herein from the perspective of the first terminal 12 and the reception is described from the perspective of the second terminal 22. The communication network 32 may comprise for example a packet-based network such as a wide area internet and/or local area network, and/or a mobile cellular network.

The first terminal 12 comprises a computer-readable storage medium 14 such as a flash memory or other electronic memory, a magnetic storage device, and/or an optical storage device. The first terminal 12 also comprises a processing apparatus 16 in the form of a processor or CPU having one or more execution units, a transceiver such as a wired or wireless modem having at least a transmitter 18, and a video camera 15 which may or may not be housed within the same casing as the rest of the terminal 12. The storage medium 14, video camera 15 and transmitter 18 are each operatively coupled to the processing apparatus 16, and the transmitter 18 is operatively coupled to the network 32 via a wired or wireless link. Similarly, the second terminal 22 comprises a computer-readable storage medium 24 such as an electronic, magnetic, and/or an optical storage device; and a processing apparatus 26 in the form of a CPU having one or more execution units. The second terminal comprises a transceiver such as a wired or wireless modem having at least a receiver 28, and a screen 25 which may or may not be housed within the same casing as the rest of the terminal 22. The storage medium 24, screen 25 and receiver 28 of the second terminal are each operatively coupled to the respective processing apparatus 26, and the receiver 28 is operatively coupled to the network 32 via a wired or wireless link.

The storage 14 on the first terminal 12 stores at least a video encoder arranged to be executed on the processing apparatus 16. When executed the encoder receives a "raw" (unencoded) input video stream from the video camera 15, encodes the video stream so as to compress it into a lower bitrate stream, and outputs the encoded video stream for transmission via the transmitter 18 and communication network 32 to the receiver 28 of the second terminal 22. The storage 24 on the second terminal 22 stores at least a video decoder arranged to be executed on its own processing apparatus 26. When executed the decoder receives the encoded video stream from the receiver 28 and decodes it for output to the screen 25.

Figure 3:
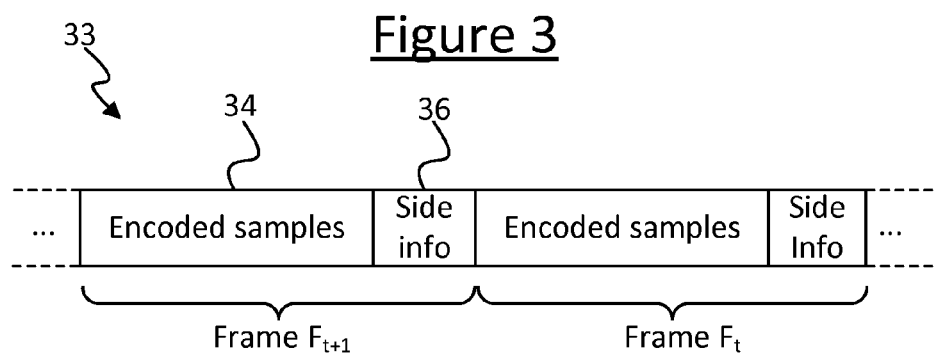
FIG. 3 is a schematic representation of an encoded video stream.

FIG. 3 gives a schematic representation of an encoded bitstream 33 as would be transmitted from the encoder running on the transmitting terminal 12 to the decoder running on the receiving terminal 22. The bitstream 33 comprises a plurality of encoded samples 34 for each frame, including any motion vectors. In one application, the bitstream may be transmitted as part of a live (real-time) video phone call such as a VoIP (Voice-over-Internet Protocol) call between the transmitting and receiving terminals 12, 22 (VoIP calls can also include video). The bitstream 33 may also comprise associated side information, example uses of which will be discussed shortly.

Figure 4:
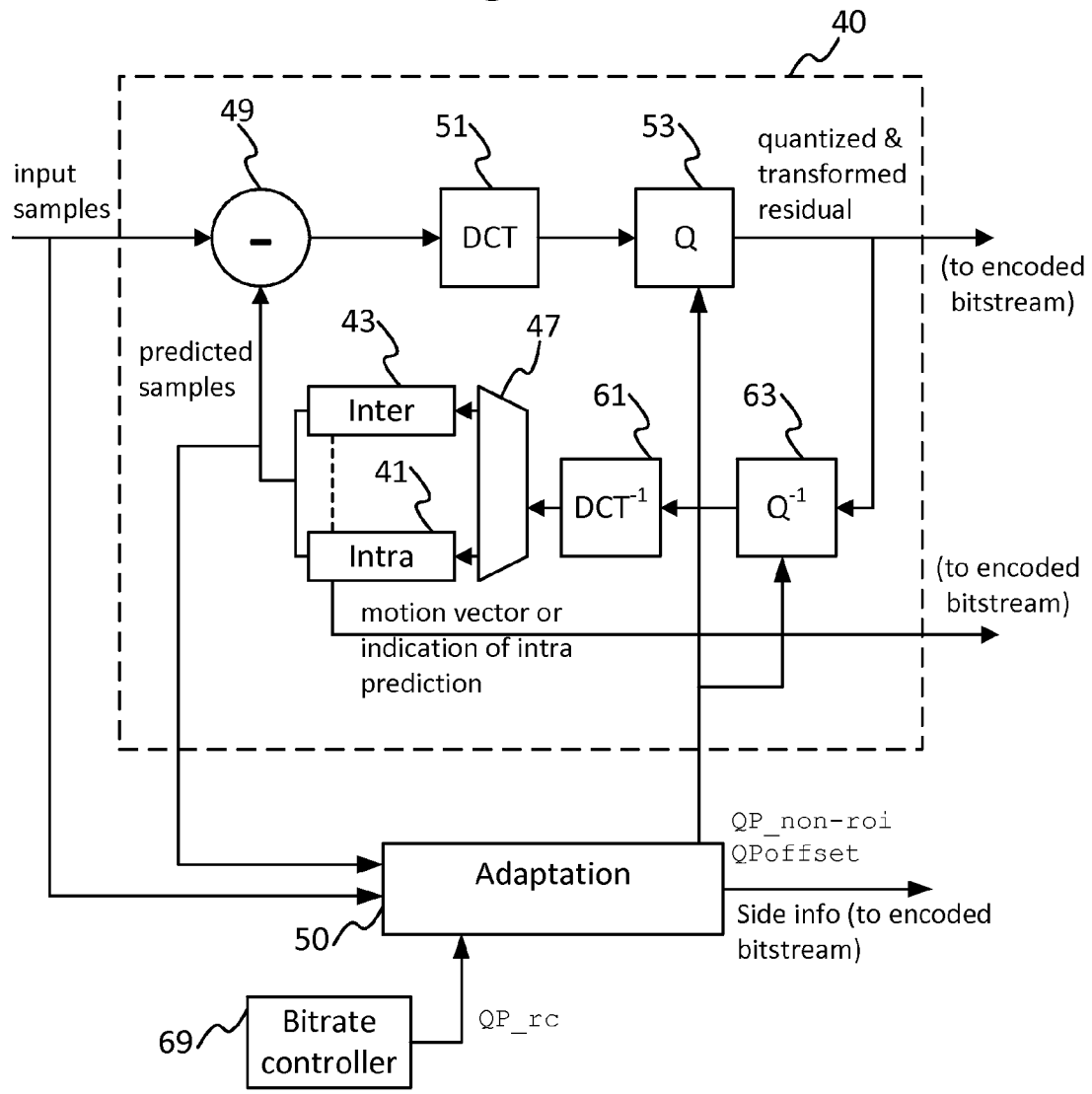
FIG. 4 is a schematic block diagram of an encoder.

FIG. 4 is a block diagram illustrating an encoder such as might be implemented on transmitting terminal 12. The encoder comprises a main encoding module 40 comprising: a discrete cosine transform (DCT) module 51, a quantizer 53, an inverse transform module 61, an inverse quantizer 63, an intra prediction module 41, an inter prediction module 43, a switch 47, and a subtraction stage (−) 49. The encoder further comprises an adaptation module 50 coupled to the encoding module 40, and a bitrate controller 69 coupled to the adaptation module 50. Each of these modules or stages may be implemented as a portion of code stored on the transmitting terminal's storage medium 14 and arranged for execution on its processing apparatus 16, though the possibility of some or all of these being wholly or partially implemented in dedicated hardware circuitry is not excluded.

The subtraction stage 49 is arranged to receive an instance of the input video signal comprising a plurality of blocks (b) over a plurality of frames (F). The input video stream is received from a camera 15 coupled to the input of the subtraction stage 49. The intra or inter prediction 41, 43 generates a predicted version of a current (target) block to be encoded based on a prediction from another, already-encoded block or other such portion. The predicted version is supplied to an input of the subtraction stage 49, where it is subtracted from the input signal (i.e. the actual signal) to produce a residual signal representing a difference between the predicted version of the block and the corresponding block in the actual input signal.

In intra prediction mode, the intra prediction 41 module generates a predicted version of the current (target) block to be encoded based on a prediction from another, already-encoded block in the same frame, typically a neighbouring block. When performing intra frame encoding, the idea is to only encode and transmit a measure of how a portion of image data within a frame differs from another portion within that same frame. That portion can then be predicted at the decoder (given some absolute data to begin with), and so it is only necessary to transmit the difference between the prediction and the actual data rather than the actual data itself. The difference signal is typically smaller in magnitude, so takes fewer bits to encode.

In inter prediction mode, the inter prediction module 43 generates a predicted version of the current (target) block to be encoded based on a prediction from another, already-encoded region in a different frame than the current block, offset by a motion vector predicted by the inter prediction module 43 (inter prediction may also be referred to as motion prediction). In this case, the inter prediction module 43 is switched into the feedback path by switch 47, in place of the intra frame prediction stage 41, and so a feedback loop is thus created between blocks of one frame and another in order to encode the inter frame relative to those of a preceding frame. This typically takes even fewer bits to encode than intra frame encoding.

The samples of the residual signal (comprising the residual blocks after the predictions are subtracted from the input signal) are output from the subtraction stage 49 through the transform (DCT) module 51 (or other suitable transformation) where their residual values are converted into the frequency domain, then to the quantizer 53 where the transformed values are converted to substantially discrete quantization indices. The quantized, transformed indices of the residual as generated by the transform and quantization modules 51, 53, as well as an indication of the prediction used in the prediction modules 41, 43 and any motion vectors generated by the inter prediction module 43, are all output for inclusion in the encoded video stream 33 (see element 34 in FIG. 3); typically via a further, lossless encoding stage such as an entropy encoder (not shown) where the prediction values and transformed, quantized indices may be further compressed using lossless encoding techniques known in the art.

An instance of the quantized, transformed signal is also fed back though the inverse quantizer 63 and inverse transform module 61 to generate a predicted version of the block (as would be seen at the decoder) for use by the selected prediction module 41 or 43 in predicting a subsequent block to be encoded, in the same way the current target block being encoded was predicted based on an inverse quantized and inverse transformed version of a previously encoded block. The switch 47 is arranged pass the output of the inverse quantizer 63 to the input of either the intra prediction module 41 or inter prediction module 43 as appropriate to the encoding used for the frame or block currently being encoded.

Figure 5:
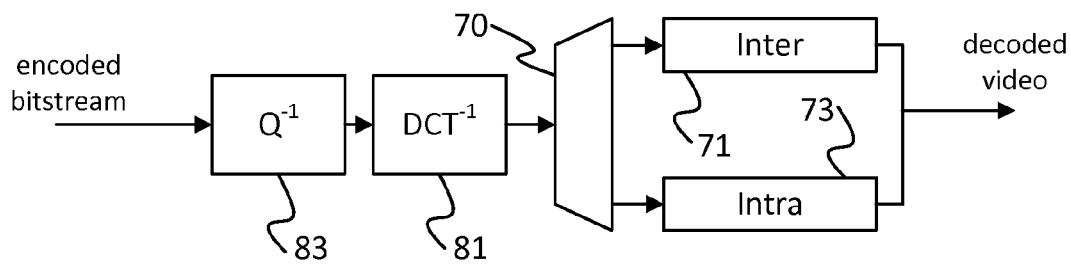
FIG. 5 is a schematic block diagram of a decoder.

FIG. 5 is a block diagram illustrating a decoder such as might be implemented on receiving terminal 22. The decoder comprises an inverse quantization stage 83, an inverse DCT transform stage 81, a switch 70, and an intra prediction stage 71 and a motion compensation stage 73. Each of these modules or stages may be implemented as a portion of code stored on the receiving terminal's storage medium 24 and arranged for execution on its processing apparatus 26, though the possibility of some or all of these being wholly or partially implemented in dedicated hardware circuitry is not excluded.

The inverse quantizer 81 is arranged to receive the encoded signal 33 from the encoder, via the receiver 28. The inverse quantizer 81 converts the quantization indices in the encoded signal into de-quantized samples of the residual signal (comprising the residual blocks) and passes the de-quantized samples to the reverse DCT module 81 where they are transformed back from the frequency domain to the spatial domain. The switch 70 then passes the de-quantized, spatial domain residual samples to the intra or inter prediction module 71 or 73 as appropriate to the prediction mode used for the current frame or block being decoded, and the intra or inter prediction module 71, 73 uses intra or inter prediction respectively to decode the blocks of each macroblock. Which mode to use is determined using the indication of the prediction and/or any motion vectors received with the encoded samples 34 in the encoded bitstream 33. The output of the DCT module 51 (or other suitable transformation) is a transformed residual signal comprising a plurality of transformed blocks for each frame. The decoded blocks are output to the screen 25 at the receiving terminal 22.

At the encoder side, the adaptation module 50 is configured to determine at least one region-of-interest (ROI) in the video being encoded for transmission. The ROI is a sub-area within (so smaller than) the area of the video image, i.e. within the frame area which is common to each frame. It is used to cover a region of the video image considered to have a higher subjective importance than the remaining region of the video image's frame area outside the ROI. The ROI may be updated per frame, or may remain in the same place within the frame area for a plurality of frames.

For example, the adaptation module 50 may be coupled to receive an instance of the original, unencoded video from the input of the encoder and may be configured to identify the ROI by applying a facial recognition algorithm (examples of which in themselves are known in the art). The facial recognition algorithm recognises a face in the video image to be encoded, and based on this identifies the region of the image comprising the face or at least some of the face (e.g. facial features like mouth, eyes and eyebrows) as the ROI. The facial recognition algorithm may be configured specifically to recognise a human face, or may recognise faces of one or more other creatures. In other embodiments an ROI may be identified on another basis than facial recognition. An alternative is to use another type of image recognition algorithm such as a motion recognition algorithm to identify a moving object as the region of interest. In another alternative, the adaptation module 50 may be configured to determine a user-defined ROI based on an input from a user of the transmitting terminal 12 or fed back by a user of the receiving terminal 22. In yet another alternative, the ROI could be fixed by the codec designer, e.g. knowing that it is intended for use in video calls and so the face will tend to be at the centre or upper-centre of the video image area.

Figure 6:
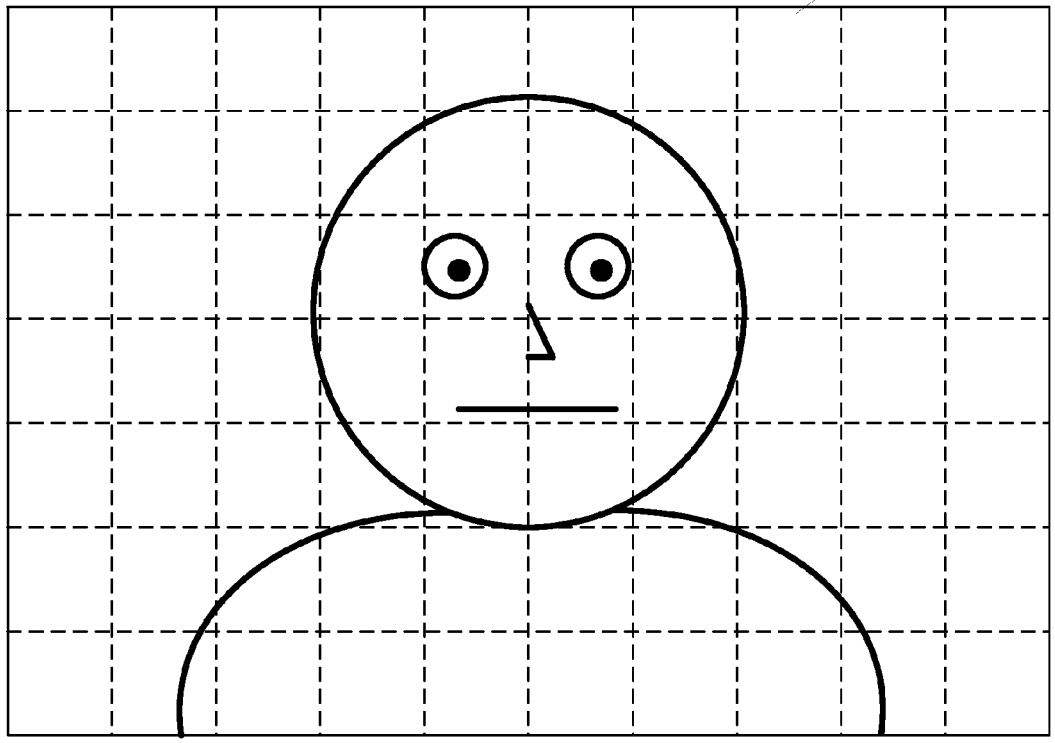
FIG. 6 is a schematic representation of a region of interest in a video image to be encoded.
Figure 6:
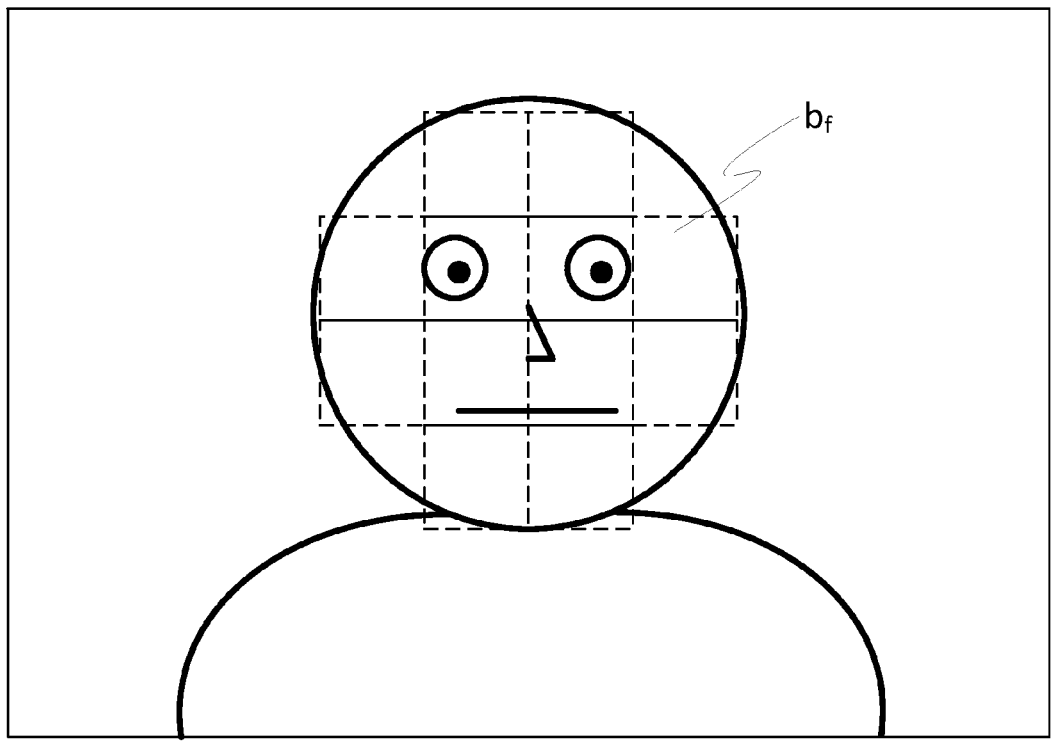

An example is illustrated schematically in FIG. 6. This shows one frame of a "talking head" type video image, e.g. as would typically occur in a video call. The top illustration in FIG. 6 shows the frame divided into blocks (b) including background blocks (bb). Note that the size of the blocks is exaggerated for illustrative purposes (relative to those of a typical video codec, though in general any size blocks can be used). The bottom illustration in FIG. 6 shows the same frame with only those blocks (bf) which have been identified as forming the region of interest (facial or foreground blocks), e.g. any block that includes at least some of the face, or a selection of blocks which cover main features of the face. In embodiments, the adaptation module 50 may generate an ROI map to indicate the blocks bf (e.g. by block index or coordinates) making up the region of interest, and/or those blocks (bb) which are not included in the region of interest.

The adaptation module 50 outputs an indication of the ROI in the side information 36, which is transmitted to the decoder at the receiving terminal 22, typically embedded in the encoded bitstream (e.g. being encoded along with the encoded samples at the entropy encoder stage). See again FIG. 3. This provides one way by which the decoder at the receiving terminal 22 may determine the same ROI. In embodiments, this indication may take the form of an ROI map identifying which portions of a frame form the ROI, e.g. which blocks (bf) or macroblocks. The ROI map or other indication may be sent every frame or less than once per frame (in which case it is considered to represent the current ROI for multiple frames until the next update is sent).

Further, the adaptation module 50 is configured to apply a different quantization granularity inside the ROI than in the non-ROI area outside, e.g. to encode the foreground blocks bf with a finer quantization and to encode the background blocks bb with a coarser granularity. To do this it may specify to the quantizer 53 (and inverse quantizer 63) an absolute quantization parameter for use in one of the ROI and non-ROI areas, and a quantization parameter offset for use in the other of the ROI and non-ROI areas wherein the offset specifies the difference relative to the absolute specified quantization parameter. For example using a H.264 codec the quantization can be specified by a quantization parameter QP representing the quantization step size in the non-ROI area (so a larger quantization parameter means coarser quantization) and a parameter QPoffset specifying the delta between the quantization parameter to be applied inside the ROI relative to the QP applied outside (QPoffset is therefore negative if the ROI is given finer quantization). An alternative would be to specify an absolute quantization parameter for each of the ROI and non-ROI. Either way, the specified information is also signalled to the decoder in the side information 36, which uses it to apply the corresponding inverse quantization at the inverse quantizer 83.

The adaptation module 50 is also configured to adjust the quantization based on the bitrate controller 69. The bitrate controller 69 is an independent module which has a model of the quantization process and is configured to output a base quantization parameter representing the quantization that would be required, if uniform over the frame, in order to meet a certain bitrate constraint. For example, the bitrate controller 69 may be connected to receive the input frames of the input bit stream and analyse these based in the model in order to determine the base quantization parameter required to meet the bitrate constraint, or alternatively may be configured to determine the base quantization parameter to meet the constraint based on a model of past statistics. The bitrate constraint itself may be determined based on a user setting, or may be determined automatically based on the available bandwidth over the channel 18, 32, 28 which the encoding bitstream 33 is transmitted over. The bitrate constraint on the video coding may be based on a user-specified or automatic distribution of a total selected or available bandwidth between audio, video and error protection. The operation of a bitrate controller will in itself be familiar to a person skilled in the art.

The adaptation module 50 is arranged to receive the base quantization parameter from the rate controller 69, and to adjust the quantization granularity applied inside and outside the ROI (e.g. adjust the background QP and QPoffset) so that the combined effect achieves substantially same overall bitrate as if the base quantization parameter was used uniformly over the whole frame.

Furthermore, according to the present disclosure the adaptation module 50 is configured to adapt the difference in quantization granularity applied between the ROI and non-ROI areas. It may do this by adapting the quantization parameter offset. For example the adaptation module 50 may be configured to specify the background QP for the non-ROI area and QPoffset for the ROI, and to adapt the difference in granularity by adapting QPoffset. An alternative way to vary the difference in granularity would be to specify an absolute QP for both ROI and non-ROI areas and to adapt one or both of these (other than by the same amount at the same time).

To perform the adaptation, the adaptation module 50 is configured to evaluate at least one metric that is indicative of a difference in benefit of the quantization between the ROI and non-ROI areas. This may be done by evaluating the metric in both the ROI and non-ROI areas and comparing the different values. One such metric that has been found to work well is a measure of the bitrate currently being incurred by the encoding in the ROI and non-ROI areas, i.e. the number of bits incurred in the respective ROI or non-ROI area of a given frame or frames (measuring number of bits and bitrate may be considered equivalent assuming the number is measured for a particular frame or frames). The ROI and non-ROI bitrates as assessed based on the encoding of the current frame may then used to adapt the difference in quantization granularity for the next frame.

In embodiments the adaptation module 50 may be configured to perform the adaptation according to steps (i) to (iii) as discussed above. That is, after starting with some initial value for QPoffset, e.g. −12, the adaptation module 50 measures the average (per pixel) number of bits incurred by encoding the non-ROI area using granularity QP, and also measures the average (per pixel) number of bits incurred by encoding the ROI using granularity QP+QPoffset. The adaptation module 50 then compares the two measures to determine whether the bitrate incurred inside the ROI is above or below some target set relative to the bitrate incurred in the non-ROI area, and adjusts the quantization difference depending on the result. The target for the ROI bitrate is greater than the non-ROI bitrate, and in embodiments is defined as a function of the non-ROI bitrate, e.g. a multiplicative function such as multiplication by a constant K. For instance:

if ROI bitrate>$K$×non-ROI bitrate, increment QPoffset by 1;

else if ROI bitrate<$K$×non-ROI bitrate, decrement QPoffset by 1;

where QPoffset is limited to a predetermined range.

In embodiments K=4 and QPoffset is limited to the range −12 to 0. This heuristic may be evaluated explicitly in the above form, or an equivalent way of determining whether the ROI bitrate is above or below a target set relative to the non-ROI bitrate is to determine whether the non-ROI bitrate is below or above a corresponding target set relative to the ROI bitrate (e.g. whether the non-ROI bitrate is <1/K×the ROI bitrate).

The above test is repeated at regular intervals, e.g. once per frame or once every few frames. The adaptation module 50 thus acts as a regulator which attempts to keep the bitrate in the ROI around a target value of K times the bitrate outside the ROI. If the background is incurring very few bits, e.g. almost zero as in a typical talking head situation, then the (negative) QP offset converges up towards zero, i.e. the difference decreases in magnitude so that the encoder converges towards using the same QP inside and outside the ROI. If however some greater number of bits is incurred in the non-ROI area, the difference in QP increases in magnitude so as to create a difference in the granularity inside and outside the ROI (capped at a certain level).

In addition, as mentioned, the absolute QP number for the non-ROI area depends on the base parameter, $QP_{rc}$, given by the rate controller 69. The adaptation module 50 attempts to achieve the same number of bits for the frame as if the frame would be quantized uniformly with QP_rc.

Thus in order to meet the constraint set by the rate controller 69, then having adapted QPoffset to meet the target for the ROI relative to the non-ROI area, the adaptation module 50 then adapts the background QP so that the overall quantization meets the bitrate constraint set by the bitrate controller 69. E.g. say for the sake of illustration the rate controller 69 sets the base QP to aim for at a value of 27. Independently of this, the adaptation module 50 determines that QPoffset should be a certain value, say a value of −12. Therefore to achieve the base QP specified by the rate controller 69, the adaptation module 50 sets the background (non-ROI) QP to a value that at least approximately achieves the same bitrate as if the frame was uniformly quantized at the base value $QP_{rc}$. This adaptation depends on the size of the ROI relative to the non-ROI. For examples say QPoffset=−12, then the QP inside the ROI ($QP_{ROI}$) and the QP outside ($QP_{non-ROI}$) could be expressed as $QP_{ROI}=QP_{rc}-5$ and $QP_{non-ROI}=QP_{rc}+7$ respectively.

One way to approximate this is to make the quantization applied inside and outside the ROI have the same average QP as the base QP over the frame (weighted by area), or over a small number of frames. For instance if the ROI takes up half the pixels of the frame area, and the non-ROI area takes up the other half, then the above example of QPoffset=−12, $QP_{ROI}=QP_{rc}-5$ and $QP_{non-ROI}=QP_{rc}+7$ would give an average equal to $QP_{rc}$ if weighted evenly by area. Averages can be calculated in different ways, e.g. weighted average and/or geometric average. The latter can be generalized to applying a nonlinear function before averaging, and then applying the inverse. For example the geometric average can be calculated as $\exp(\mathrm{mean}(\log(QP_{vector})))$, where $QP_{vector}$ is the QP a function of position in the frame. E.g. in H264 it is possible to set QP for each macroblock (16 by 16 pixels). In principle, it would also be possible to set for smaller blocks, e.g. 4×4, or 8×8 which is the typical blocksize of typical DCT-style transforms, or even individual pixels.

In fact, the average QP is generally not exactly equal to $QP_{rc}$ (the base QP) after adaptation. Typically the rate increase is larger when decreasing QP than the rate decrease when increasing QP (even though in classical R-D theory it should be because QP is logarithmically spaced). In other words the QP vs. rate plot is a concave-up decreasing curve. Therefore the rate would typically be higher if maintaining same average QP. This fact can be accounted for with a heuristic formula designed empirically to give the desired result. In one example implementation, a neural network may be set up to map between $QP_{vector}$ and base QP. To speed up learning, $QP_{vector}$ may be condensed into mean, standard deviation, third moment It will be appreciated that the above embodiments have been described only by way of example.

For instance, one or more other alternative or additional metrics may be used to assess the relative benefit of the quantization inside vs. outside the ROI. Other metrics that can be used to measure benefit of coding include a rate-distortion metric, or a measure of flatness. Further, the scope of the disclosure is not limited to the above heuristic, and other functions may be set to achieve a desired balance based on the metric or metrics in question.

The above has been described in terms of there being one ROI, but in embodiments there may be multiple ROIs within the frame area and the metric or metrics may be assessed for the multiple ROIs and compared with the non-ROI area. In embodiments, the non-ROI area refers to the whole remaining region of the frame area not taken up by the one or more ROIs, but it could also refer to a smaller area outside the one or more ROIs. In embodiments the metric or metrics are evaluated based on the whole region inside the ROI and/or based on the whole non-ROI region, but in alternative embodiments the metric or metrics may be evaluated based on only a representative sub-region within the ROI and/or based on only a representative sub-region within the non-ROI area.

Further, while the above has been described in terms of blocks and macroblocks, the region of interest does not have to be mapped or defined in terms of the blocks or macroblocks of any particular standard. In embodiments the ROI may be mapped or defined in terms of any portion or portions of the frame, even down to a pixel-by-pixel level, and the portions used to define the region of interest do not have to be same as the divisions used for other encoding/decoding operations such as prediction (though in embodiments they may well be).

While the above has been described in relation to the H.264 standard, the scope of the disclosure limited to any particular codec or standard and in general the techniques disclosed herein can be implemented either in the context of an existing standard such as H264 or H.265 or as a bespoke codec. Further, the scope of the disclosure is not restricted specifically to any particular representation of video samples whether in terms of RGB, YUV or otherwise. Nor is the scope limited to any particular quantization, nor to a DCT transform. E.g. an alternative transform such as a Karhunen-Loeve Transform (KLT) could be used, or no transform may be used. Further, the disclosure is not limited to VoIP communications or communications over any particular kind of network, but could be used in any network or medium capable of communicating data.

The described embodiments are not limited to an application in which the encoded video is transmitted over a network. For example in another application, receiving may also refer to receiving the video from a storage device such as an optical disk, hard drive or other magnetic storage, or "flash" memory stick or other electronic memory. In this case the video may be transferred by storing the video on the storage medium at the transmitting device, removing the storage medium and physically transporting it to be connected to the receiving device where it is retrieved. Alternatively the receiving device may have previously stored the video itself at local storage.

Further, the decoder does not necessarily have to be implemented at an end user terminal, nor output the video for immediate consumption at the receiving terminal. In alternative implementations, the receiving terminal may be an intermediate terminal such as a server running the decoder software, for outputting video to another terminal in decoded or transcoded form, or storing the decoded video for later consumption. Similarly the encoder does not have to be implemented at an end-user terminal, nor encode video originating from the transmitting terminal. In other embodiments the transmitting terminal may for example be an intermediate terminal such as a server running the encoder software, for receiving video in unencoded or alternatively-coded form from another terminal and encoding or transcoding that video for storage at the server or forwarding to a receiving terminal.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the terminals may include an entity (e.g. software) that causes hardware of the user terminals to perform operations, e.g., processors functional blocks, and so on. For example, the terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An encoder comprising: an encoding module configured to:
   encode video in at least one region-of-interest and outside the region-of-interest, the encoding comprising quantization; and
   apply a difference in quantization granularity between the encoding inside and outside the region-of-interest; and
   an adaptation module configured to:
   determine at least one metric representative of a difference in benefit of the quantization inside and outside the region-of-interest, the at least one metric comprising an indication of bitrate incurred by encoding inside the region-of-interest relative to bitrate incurred by encoding outside; and
   adapt based, at least in part, on the indication, the difference in quantization granularity.

2. The encoder of claim 1, wherein the determination of said indication comprises determining whether the bitrate incurred in the region-of-interest is above a target amount greater than the bitrate incurred outside the region-of-interest.

3. The encoder of claim 2, wherein the adaptation module is further configured to decrease the difference in quantization granularity on condition of detecting that the bitrate inside the region-of-interest is above the target, and/or to increase the difference in quantization granularity on condition of detecting that the bitrate inside the region-of-interest is below the target.

4. The encoder of claim 3, wherein the adaptation module is further configured to test the threshold at a series of discrete times, and to decrement the difference in quantization granularity by a predetermined step each time the bitrate inside the region-of-interest is detected as being above the target, and/or to increment the difference in quantization granularity by a predetermined step each time the bitrate inside the region-of-interest is detected as being below the target.

5. The encoder of claim 4, wherein the discrete times are one per frame.

6. The encoder of claim 2, wherein the amount by which the target is greater than the bitrate outside region-of-interest is a function of the bitrate outside the region-of-interest.

7. The encoder of claim 6, wherein the target is K times the bitrate outside the region-of-interest where K is a constant.

8. The encoder of claim 7, where K is substantially equal to 4.

9. The encoder of claim 1, wherein the adaptation module is further configured to adapt the quantization granularity by adjusting a quantisation offset parameter and the offset parameter is negative such that increasing the offset parameter decreases the difference in granularity.

10. The encoder of claim 1, wherein the adaptation module is further configured to cap the difference in quantization granularity to a maximum difference.

11. The encoder of claim 1, wherein the adaptation module is further configured to:
    determine a measure of the bitrate incurred by encoding in the region-of-interest;
    determine a measure of the bitrate incurred by encoding outside the region-of-interest; and
    determine said indication at least by comparing the measures to determine the indication.

12. The encoder of claim 11, wherein the measure of bitrate is an average number of bits per pixel.

13. The encoder of claim 11, wherein the measure is determined over the whole region-of-interest and/or the whole region outside the region-of-interest.

14. The encoder of claim 1, wherein the encoding module is further configured to encode in multiple regions-of-interest, and the at least one metric comprises a representation of a difference in benefit of the quantization inside the regions-of-interest relative to outside.

15. The encoder of claim 1 further comprising:
    a bitrate controller configured to set an overall quantization granularity, and
    wherein the adaptation module is further configured to adapt the difference in quantization granularity and a quantization granularity inside or outside the region-of-interest to obtain an overall output bitrate substantially corresponding to the overall quantization granularity target.

16. The encoder of claim 1 further configured to output the encoded video in a live video stream.

17. The encoder of claim 1 further configured to output the encoded video over a network.

18. A computer program product comprising code embodied on one or more computer-readable hardware storage memory devices and configured so as, responsive to execution by at least one processor, to perform operations comprising:
    encoding video in at least one region-of-interest and outside the region-of-interest, the encoding comprising quantization and the encoding module being operable to apply a difference in quantization granularity between the encoding inside and outside the region-of-interest;
    determining at least one metric representative of a difference in benefit of the quantization inside and outside the region-of-interest, the at least one metric comprising an indication of bitrate incurred by encoding inside the region-of-interest relative to bitrate incurred by encoding outside; and
    adapting based, at least in part, on the at least one metric, the difference in quantization granularity.

19. The computer program product of claim 18 further configured to perform operations comprising:
    determining the indication by determining whether the bitrate incurred in the region-of-interest is above a target amount greater than the bitrate incurred outside the region-of-interest.

20. A method of providing an encoder comprising an encoding module for encoding video in at least one region-of-interest and outside the region-of-interest, wherein the encoding comprises quantization and the encoding module is operable to apply a difference in quantization granularity between the encoding inside and outside the region-of-interest; the method comprising:

provifing an adaptation module configured to determine at least one dynamically evaluated metric representative of a difference in benefit of the quantization inside and outside the region-of-interest, and adapt the difference in quantization granularity in dependence on said dynamically evaluated metric;

arranging said dynamically evaluated metric and said adaptation such that the behaviour of the encoder approximates that which would be achieved by optimizing a rate-distortion function based on an overall distortion metric $D_p = D_{ROI} + w \cdot D_{non-ROI}$, where $D_{ROI}$ is a measure of distortion inside the region-of-interest, $D_{non-ROI}$ is a measure of distortion outside the region-of-interest, and w is a weighting factor.

\* \* \* \* \*